US007137412B2

(12) United States Patent
Watanabe

(10) Patent No.: US 7,137,412 B2
(45) Date of Patent: Nov. 21, 2006

(54) RELAY

(75) Inventor: Tetsuya Watanabe, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/293,299

(22) Filed: Dec. 5, 2005

(65) Prior Publication Data

US 2006/0231148 A1 Oct. 19, 2006

(30) Foreign Application Priority Data

Apr. 13, 2005 (JP) ............................ 2005-115788

(51) Int. Cl.
*F15C 1/04* (2006.01)
*F15B 21/00* (2006.01)
*F16K 49/00* (2006.01)

(52) U.S. Cl. ....................... 137/807; 137/341; 137/828

(58) Field of Classification Search ................ 137/807, 137/828, 341, 334
See application file for complete search history.

(56) References Cited

U.S. PATENT DOCUMENTS 4,505,539 A * 3/1985 Auracher et al. ............. 385/19
5,699,462 A * 12/1997 Fouquet et al. ............... 385/18
6,072,924 A * 6/2000 Sato et al. .................... 385/18
6,360,775 B1 * 3/2002 Barth et al. ................. 137/828

FOREIGN PATENT DOCUMENTS

JP 09-061275 A 3/1997
JP 11-074539 A 3/1999

* cited by examiner

*Primary Examiner*—A. Michael Chambers
(74) *Attorney, Agent, or Firm*—Sughrue Mion, PLLC

(57) ABSTRACT

A relay long in service life aiming at higher reliability and lower cost is achieved by use of a technology of microelectromechanical•systems. The relay comprises a flow path having narrow chokes and wide chokes, formed by bonding two insulating members together, a plurality of liquid chambers formed by partitioning the flow path with the narrow chokes and the wide chokes, a plurality of electrodes disposed at the plurality of the liquid chambers, respectively, first and second gas chambers disposed so as to communicate with respective ends of the flow path, a gas sealed in the first and second gas chambers, respectively, heating means for heating the gas, and holes defined in one of the insulating members, communicating with the flow path, respectively, wherein a conductive fluid is introduced into the flow path through respective inlet ports of the holes, and the respective inlet ports are sealed.

9 Claims, 7 Drawing Sheets

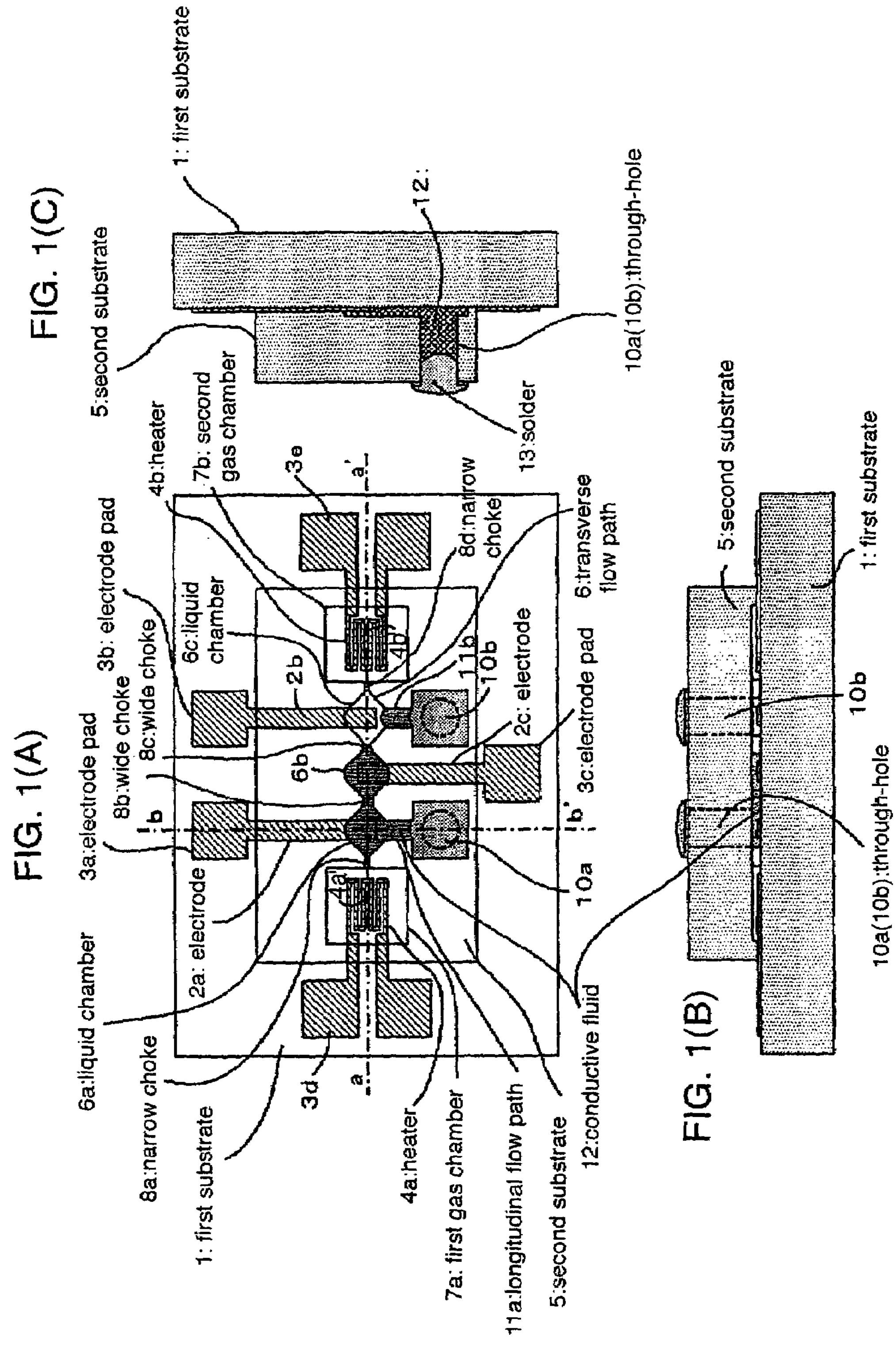
FIG. 1(A)
FIG. 1(B)
FIG. 1(C)
1: first substrate
5:second substrate
12:
10a(10b):through-hole
13:solder
3a:electrode pad
8b:wide choke
8c:wide choke
3b: electrode pad
6c:liquid chamber
4b:heater
7b: second gas chamber
3e
a'
8d:narrow choke
6:transverse flow path
2b
11b
10b
2c: electrode
3c:electrode pad
6b
b
b'
10a
2a: electrode
4a'
4b'
6a:liquid chamber
8a:narrow choke
1: first substrate
3d
a
4a:heater
7a: first gas chamber
11a:longitudinal flow path
5:second substrate
12:conductive fluid

RELAY

FIELD OF THE INVENTION

The invention relates to a relay using a conductive fluid (for example, mercury, GaIn, and GaInSn), and more particularly, to a relay aiming at higher reliability and lower cost.

BACKGROUND OF THE INVENTION

As a conventional relay, there has been used a mechanical relay with a metal contact, and a contact type relay such as a mercury relay, a lead relay, and so forth.

A major problem with the relay is a service life of a contact. A relay long in service life, and highly reliable is much in demand in various sectors of the industry, however, the present situation is that a relay decisively meeting the demand is not available as yet. Meanwhile, the mercury relay is shunned by users because of problems of environmental pollution, and a high cost thereof although it has high reliability. Preceding Patent Documents concerning a mercury relay, and a semiconductor relay replacing a mercury relay, respectively, include the followings:

[Patent Document 1] JP 9-61275 A

[Patent Document 2] JP 11-74539 A

A technology disclosed in Patent Document 1 is concerned with an apparatus for detecting a drop in pressure of hydrogen gas sealed inside the mercury relay, and a technology disclosed in Patent Document 2 is concerned with the semiconductor relay wherein the product of an on-resistance at the time of conduction/shut-off of a contact, and capacitance at the time of shut-off/conduction of the contact is low, and a low on-resistance is achieved at a low capacitance between output terminals in a low voltage region, thereby enabling applications at a radio frequency to be developed.

SUMMARY OF THE INVENTION

With a common mercury relay, contacts are placed in a vessel sealed with glass, and the contacts are always in a wet condition because mercury is placed in the vessel, thereby enhancing reliability of the contacts.

However, the relay described is shunned by users because of its high cost, and environmental impact when it is disposed of, so that it is being used in a limited way only in parts where reliability is highly required.

It is therefore an object of the invention to achieve high reliability by fabricating a highly reliable mercury relay by use of a technology of the microelectromechanical•systems (=MEMS), and to provide the relay with less environmental impact by reducing an amount of a conductive fluid (for example, mercury, GaIn, and GaInSn) to be used.

To that end, in accordance with a first aspect of the present invention, there is provided a relay comprising a flow path having narrow chokes and wide chokes, formed by bonding two insulating members together, a plurality of liquid chambers formed by partitioning the flow path with the narrow chokes and the wide chokes, a plurality of electrodes disposed at the plurality of the liquid chambers, respectively, first and second gas chambers disposed so as to communicate with respective ends of the flow path, a gas sealed in the first and second gas chambers, respectively, heating means for heating the gas, and holes defined in one of the insulating members, communicating with the flow path, respectively, wherein a conductive fluid is introduced into the flow path through respective inlet ports of the holes, and the respective inlet ports are sealed.

With these features, the plurality of the electrodes each are disposed so as to have one end being in contact with the conductive fluid sealed in the flow path, and to have the other end coming into contact, or non-contact with the conductive fluid shifting inside the flow path due to expansion/contraction of the gas on the basis of ON/OFF of the heating means.

In accordance with a second aspect of the present invention, there is provided a relay comprising a flow path having narrow chokes and wide chokes, formed by bonding two insulating members together, a plurality of liquid chambers formed by partitioning the flow path with the narrow chokes and the wide chokes, first and second gas chambers disposed so as to communicate with respective ends of the flow path, a gas sealed in the first and second gas chambers, respectively, heating means for heating the gas, and at least two holes defined in one of the insulating members, communicating with the flow path, respectively, wherein a conductive fluid is introduced into the flow path through an inlet port of at least one of the at least two holes, and the inlet port is sealed with a conductive member so that the conductive fluid comes into contact with the conductive member.

With the relay having those features, the two insulating members may be formed such that one thereof is larger or smaller in area than the other.

With the relay having those features, the flow path, the electrodes, the liquid chambers, and the gas chambers may be formed by use of a technology of a microelectromechanical•systems.

With the relay having those features, the conductive fluid may include any selected from the group consisting of mercury, GaIn, and GaInSn, and the gas may include any selected from the group consisting of air, nitrogen, argon, hydrogen, and ammonia.

It is evident form the foregoing that the present invention has the following advantageous effects.

The present invention provides in its first aspect the relay comprising a flow path having narrow chokes and wide chokes, formed by bonding two insulating members together, a plurality of liquid chambers formed by partitioning the flow path with the narrow chokes and the wide chokes, a plurality of electrodes disposed at the plurality of the liquid chambers, respectively, first and second gas chambers disposed so as to communicate with respective ends of the flow path, a gas sealed in the first and second gas chambers, respectively, heating means for heating the gas, and holes defined in one of the insulating members, communicating with the flow path, respectively, and the conductive fluid is introduced into the flow path through respective inlet ports of the holes, and the respective inlet ports are sealed.

Further, because the plurality of the electrodes each are disposed so as to have one end being in contact with the conductive fluid sealed in the flow path, and to have the other end coming into contact, or non-contact with the conductive fluid shifting inside the flow path due to expansion/contraction of the gas on the basis of ON/OFF of the heating means, the following advantageous effects can be obtained:

1) A relay with high reliability and a long service life can be implemented since it has no moving parts, and no poor contact.

2) Reduction in cost can be aimed at because it is possible to concurrently fabricate a multitude of relay chips on a substrate.

The present invention provides in its second aspect the relay comprising a flow path having narrow chokes and wide chokes, formed by bonding two insulating members together, a plurality of liquid chambers formed by partitioning the flow path with the narrow chokes and the wide chokes, first and second gas chambers disposed so as to communicate with respective ends of the flow path, a gas sealed in the first and second gas chambers, respectively, heating means for heating the gas, and at least two holes defined in one of the insulating members, communicating with the flow path, respectively, and a conductive fluid is introduced into the flow path through an inlet port of at least one of the at least two holes, and the inlet port is sealed with a conductive member so that the conductive fluid comes into contact with the conductive member.

As a result, the conductive fluid in the flow path functions as an electrical lead, so that lower resistance can be easily achieved (with the relay according to the first aspect of the present invention, a thin metal film is used as an electrical lead, so that it is necessary to render a film thickness extremely large in order to lower electrical resistance, and further, there exist problems in respect of melting resistance of contact electrodes in contact with the conductive fluid, due to the effect of the conductive fluid, and bimetallic thermal electromotive force).

With the relay having those features, since the flow path, the electrodes, the liquid chambers, and the gas chambers may be formed by use of the technology of the microelectromechanical•systems, it is possible to reduce a volume of the flow path and an amount of mercury (for example, to the order of $1\times10^{-6}$ g. As a result, it is possible to lessen environmental impact of mercury, so that 10,000 pieces of relays can be fabricated with an amount (about 0.1 g) of mercury, corresponding to that for a fluorescent lamp.

BRIEF DESCRIPTION OF THE DRAWINGS

FIGS. 1(A) to 1(C) are block diagrams illustrating principal parts of one embodiment of a relay according to the invention, in which FIG. 1(A) is a plan view, FIG. 1(B) a sectional view taken on line a–a' in FIG. 1(A), and FIG. 1(C) a sectional view taken on line b–b' in FIG. 1(A);

FIGS. 3(A) to 3(C) are block diagrams illustrating principal parts of another embodiment of a relay according to the invention, in which FIG. 3(A) is a plan view, FIG. 3(B) a sectional view taken on line b–b' in FIG. 3(A), and FIG. 3(C) a sectional view taken on line a–a' in FIG. 3(A);

PREFERRED EMBODIMENTS OF THE INVENTION

Figure 2:
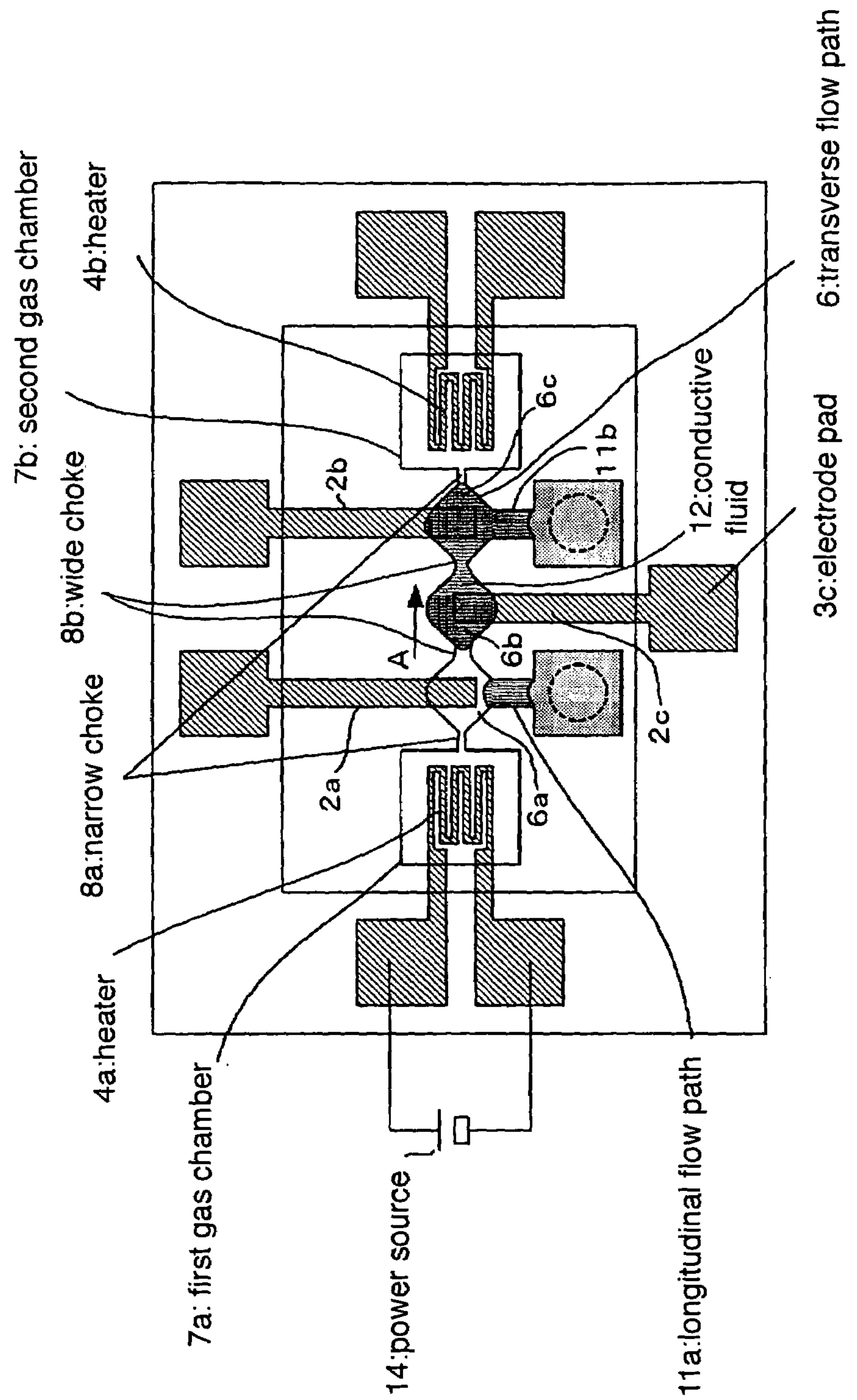
FIG. 2 is a schematic operation block diagram illustrating the operation of the relay in FIGS. 1(A) to 1(C)

FIGS. 1(A) to 1(C) are block diagrams illustrating principal parts of one embodiment of a relay according to the invention by way of example, in which FIG. 1(A) is a plan view, FIG. 1(B) a sectional view taken on line a–a' in FIG. 1(A), and FIG. 1(C) a sectional view taken on line b–b' in FIG. 1(A). Provided, however, that in the plan view of FIG. 1(A), parts that should have been indicated by dotted lines are indicated by solid lines.

In these figures, a first substrate 1 is formed of glass of an insulator, rectangular in shape. Over the first substrate 1, electrodes 2*a*, 2*b*, each made up of a thin metal film, are formed in a parallel state so as to be apart from each other with a predetermined interval provided therebetween, and an electrode 2*c* made up of a thin metal film, identical in shape to the electrodes 2*a*, 2*b*, is formed so as to oppose the electrodes 2*a*, 2*b*, respectively, and to be disposed therebetween. These electrodes 2*a*, 2*b*, and 2*c* each are formed in a bar-like shape, and electrode pads 3*a*, 3*b*, 3*c* are formed at respective end thereof. Heaters 4*a*, 4*b*, each having a middle part formed in a comb-like shape, are formed over the first substrate 1.

A second substrate 5 is formed of glass rectangular in shape, similarly to the first substrate 1, and is fixedly attached to a face of the first substrate 1, with the electrodes 2*a*, 2*b*, 2*c*, and the heaters 4*a*, 4*b*, formed thereon, by adhesion, and so forth. A transverse flow path 6 is formed on a fixture face of the second substrate 5, and at respective ends of the transverse flow path 6, there are formed first and second gas chambers 7*a*, 7*b*, respectively, so as to communicate with the flow path 6. Further, the transverse flow path 6 is provided with narrow chokes 8*a*, 8*d*, and wide chokes 8*b*, 8*c*, formed at predetermined intervals, respectively, such that with the present embodiment, the transverse flow path 6 is partitioned into three liquid chambers 6*a*, 6*b*, 6*c* by those chokes.

Further, the second substrate 5 is provided with two through-holes 10*a*, 10*b* defined at positions opposite to the electrodes 2*a*, 2*b*, respectively, so as to be oriented in the vertical direction from the surface of the substrate of the second substrate 5, and longitudinal flow paths 11*a*, 11*b*, communicating with the liquid chambers 6*a*, 6*c*, respectively, are formed at respective bottoms of the through-holes 10*a*, 10*b*.

The relay shown in FIGS. 1(A) to 1(C) represents a state in which a face of the first substrate 1, on a side thereof, where the electrodes 2*a*, 2*b*, 2*c*, and the heaters 4*a*, 4*b* are formed, is faced with the fixture face of the second substrate 5, on a side thereof, where the transverse flow path 6 and the gas chambers 7*a*, 7*b* are formed, in such way as to airtightly oppose each other to be then bonded together by means of thermal compression bonding, adhesion (not shown), and so forth.

With the present embodiment, the second substrate 5 is formed so as to be smaller in size than the first substrate 1 to the extent that respective pad portions (3*a*, 3*b*, 3*c*) of the electrodes and respective pad portions (3*d*. 3*e*) at respective ends of the heaters 4*a*, 4*b*, formed on the first substrate 1, lie off an area of the second substrate 5 in a state where these substrates are bonded together.

Further, with the present embodiment, one extremity of the electrode 2*a* is disposed in the liquid chamber 6*a* as partitioned, one extremity of the electrode 2*b* is disposed in the liquid chamber 6*c* as partitioned, and one extremity of the electrode 2*c* is disposed in the liquid chamber 6*b* as partitioned, respectively, such that the electrode 2*c* is positioned so as to oppose the electrodes 2*a*, 2*b*, respectively. The comb-like parts 4*a*', 4*b*' of the heaters 4*a*, 4*b* are disposed so as to be encapsulated in the gas chambers 7*a*, 7*b*, respectively.

A conductive fluid (for example, mercury) 12 is introduced into the liquid chambers 6*a*, 6*b*, and 6*c* of the transverse flow path 6, respectively, via the through-holes 10*a*, 10*b* and the longitudinal flow paths 11*a*, 11*b* to be then sealed therein.

In this case, a portion of the conductive fluid 12, introduced through the through-hole 10*b* on the right side in the figure, stops advancing precisely upon reaching the liquid chamber 6*c* of the transverse flow path 6.

Further, another portion of the conductive fluid 12, introduced through the through-hole 10*a* on the left side in the figure, continues advancing even upon reaching the liquid chamber 6*a* of the transverse flow path 6, and introduction of that portion of the conductive fluid 12 continues until the liquid chamber 6*b* at the center of the transverse flow path 6 is filled up. Now, the chokes 8*a*, 8*d*, disposed between respective ends of the transverse flow path 6, and the gas chambers 7*a*, 7*b* with the heaters 4*a*, 4*b* disposed therein, respectively, are chokes narrow enough not to allow the conductive fluid 12 to be shifted toward the gas chambers 7*a*, 7*b*, respectively, owing to the surface tension of mercury while the chokes 8*b*, 8*c*, interconnecting the liquid chambers 6*a*, 6*b*, 6*c*, respectively, are formed in such a way as to allow the conductive fluid 12 to be shifted when a predetermined pressure is applied to the conductive fluid although shifting is prevented owing to the surface tension of mercury in a steady state condition.

A gas, such as, for example, air, nitrogen gas, and so forth, is sealed in the gas chambers 7*a*, 7*b*, respectively. Further, in order to prevent oxidation of the conductive fluid, the interior of the transverse flow path 6 may be evacuated or purged by use of an inert gas such as nitrogen or argon prior to the introduction of the conductive fluid 12. Also, if the holes are closed by introducing the inert gas into the flow path before the introduction of the conductive fluid therein, this will enable the inert gas to be sealed therein. Effects of oxidation prevention can be further enhanced by use of a reducing gas, such as hydrogen, carbon monoxide, and so forth, in place of the inert gas, or by use of a mixed gas of the inert gas, and the reducing gas. These countermeasures for oxidation prevention are particularly important in the case of using GaInSn whose surface is susceptible to oxidation as the conductive fluid.

The electrodes are formed around the through-holes 10*a*, 10*b*, respectively, in the second substrate 5 disposed on the upper side of the relay, and respective inlet ports of the through-holes 10*a*, 10*b* are closed with a conductive adhesive 13 such as solder or silver paste.

The conductive fluid (for example, mercury) 12 in a steady state condition is positioned in the liquid chambers 6*a*, 6*b*, and remain stable in positions shown in the figure by the agency of the surface tension of mercury, and the effect of the chokes 8*a*, 8*c*. In this condition, the contact electrodes 2*a*, 2*c* are in the conduction state, and the electrodes 2*b*, 2*c* are in the OFF state.

FIG. 2 shows a state where the heater 4*a* inside the gas chamber 7*a* is energized by a power source 14, and a gas (air, nitrogen gas, and so forth) is expanded by the agency of heat generated by the heater 4*a*.

As a result, a predetermined pressure is applied to the conductive fluid (mercury) 12, whereupon the conductive fluid 12 is shifted from the side of the liquid chamber 6*a* toward the side of the liquid chambers 6*b*, 6*c* as indicated by an arrow A. Consequently, the electrodes 2*a*, 2*c* are in the OFF state, and the electrodes 2*c*, 2*b* are in the ON state.

Subsequently, if the power source 14, for the heater 4*a*, is turned OFF, and the heater 4*b* is energized by use of a power source (not shown), such a state as shown in FIG. 1 is restored.

FIGS. 3(A) to 3(C) are block diagrams illustrating principal parts of another embodiment of a relay according to the invention. With the present embodiment, flow paths are formed in place of the electrodes 2*a*, 2*b*, 2*c*, each made up of the thin metal film, as shown in FIG. 1, and the flow paths are filled up with a conductive fluid, respectively, to enable the flow paths to serve as electrodes, respectively. FIG. 3(A) is a plan view, FIG. 3(B) a sectional view taken on line b–b' in FIG. 3(A), and FIG. 3(C) a sectional view taken on line a–a' in FIG. 3(A). The present embodiment except for a configuration of the flow paths is the same as the embodiment shown in FIG. 1, omitting therefore repeated description.

On a face of a second substrate 5*a*, on one side thereof, there are formed electrode pads 3*d*, 3*e*, 3*f* at positions corresponding to the electrode pads 3*a*, 3*b*, 3*c* shown in FIG. 1, respectively, and through-holes 10*d*, 10*e*, 10*f* are defined in the second substrate 5*a* so as to penetrate therethrough from the top faces of the respective electrode pads. Further, there are formed longitudinal flow paths 11*d*, 11*e*, 11*f*, leading from respective openings of the through-holes, on a face of the second substrate 5*a*, on the other side thereof, and communicating with liquid chambers 6*a*, 6*c*, 6*b*, respectively.

Then, as with the case of the relay shown in FIG. 1, a first substrate 1*a* is bonded with the second substrate 5*a*, and subsequently, a conductive fluid (for example, mercury, a GaInSn alloy) is introduced through the respective through-holes. With the present embodiment, although the conductive fluid is introduced through the respective three thoughholes, a portion of the conductive fluid, introduced through the through-hole 10*e* in an upper right part in the figure, stops advancing precisely upon reaching the liquid chamber 6*c*.

Respective portions of the conductive fluid, introduced through the through-holes 10*d*, 10*f*, in upper left and lower center parts in the figure, respectively, continues advancing even upon reaching the liquid chambers 6*a*, 6*b*, respectively, until the respective portions of the conductive fluid from the longitudinal flow path 11*d* communicating with the through-hole 10*d* in the upper left part of the figure, and the longitudinal flow path 11*f* communicating with the through-hole 10*f* in the lower center part of the figure are joined together in the liquid chambers 6*a*, 6*b*.

Further, with the present embodiment as well, the interiors of the flow paths may be evacuated or purged by use of an inert gas such as nitrogen or argon prior to the introduction of the conductive fluid in order to prevent oxidation of the conductive fluid, as previously described.

Further, if the respective holes are closed by introducing an inert gas into the respective flow paths before the introduction of the conductive fluid therein, the inert gas can be sealed therein. Effects of oxidation prevention can be further enhanced by use of a reducing gas such as hydrogen, carbon monoxide, and so forth, in place of the inert gas, or by use of a mixed gas of the inert gas, and the reducing gas. The electrode pads 3*d*, 3*e*, 3*f* are formed around the through-holes 10*d*, 10*e*, 10*f*, respectively, in the second substrate 5, and the respective through-holes are sealed with a conductive adhesive such as solder 13 or silver paste (not shown).

Figure 4:
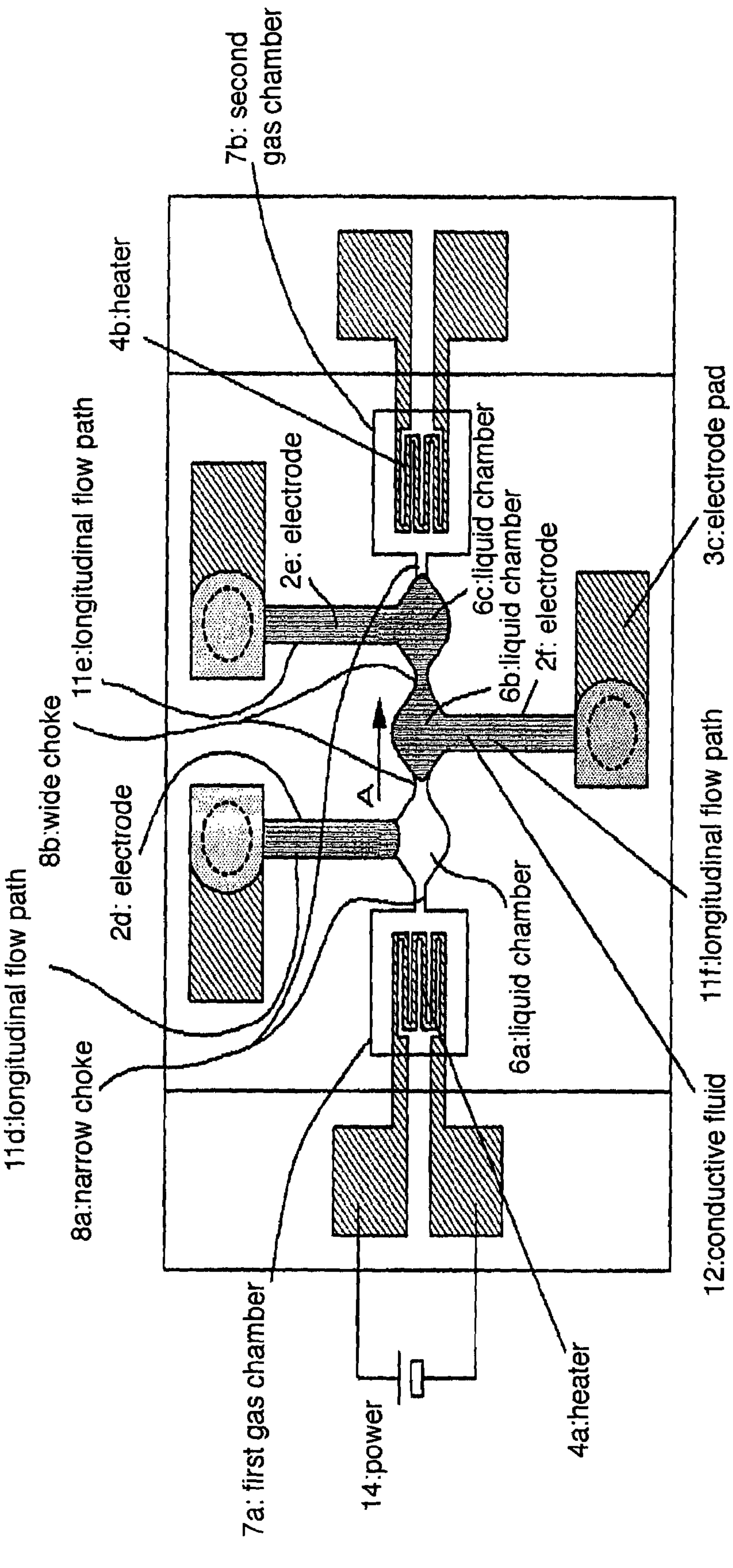
FIG. 4 is a schematic operation block diagram illustrating the operation of the relay in FIGS. 3(A) to 3(C)

FIG. 4 shows a state where a heater 4*a* inside a gas chamber 7*a* is energized by a power source 14, and a gas (air, nitrogen gas, and so forth) is expanded by the agency of heat generated by the heater 4*a*.

As a result, the conductive fluid (mercury) 12 is shifted from the side of the liquid chamber 6*a* toward the side of the liquid chambers 6*b*, 6*c* as indicated by an arrow A. Consequently, electrodes 2*d*, 2*f* are in the OFF state, and the electrodes 2*f*, 2*e* are in the ON state.

Figure 3:
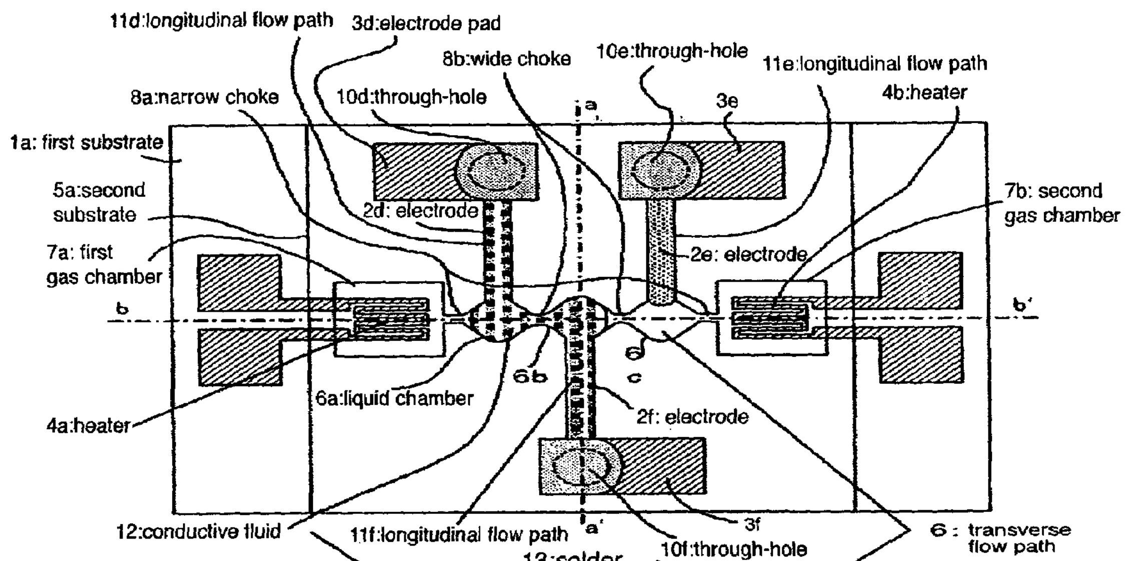
Figure 3:
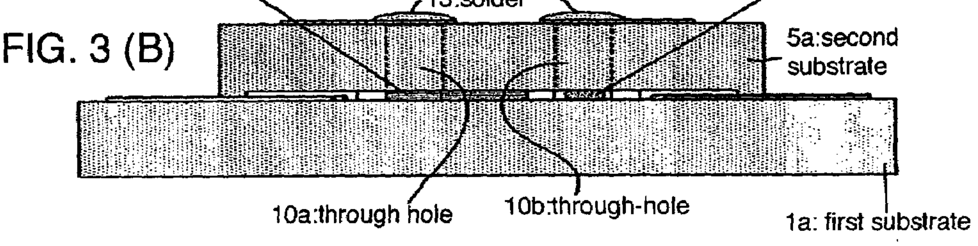
Figure 3:
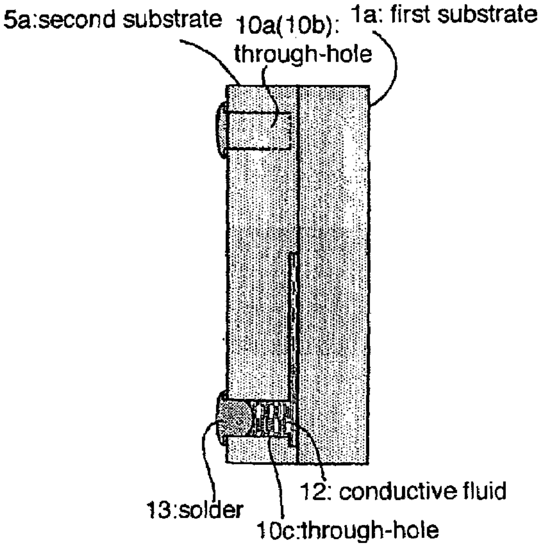

With the present embodiment as well, if the power source 14, for the heater 4*a*, is turned OFF, and the heater 4*b* is energized by use of a power source (not shown), such a state as shown in FIG. 3 is restored.

With such a configuration as described, respective portions of the conductive fluid, in the flow paths, function as electrical leads, so that lower resistance can be easily achieved. With the relay shown in FIG. 1, the thin metal film is used as an electrical lead, so that it is necessary to render a film thickness extremely large in order to lower electrical resistance. Further, there exist problems in respect of melting resistance of contact electrodes in contact with the conductive fluid, due to the effect of the conductive fluid, and bimetallic thermal electromotive force.

Figure 5:
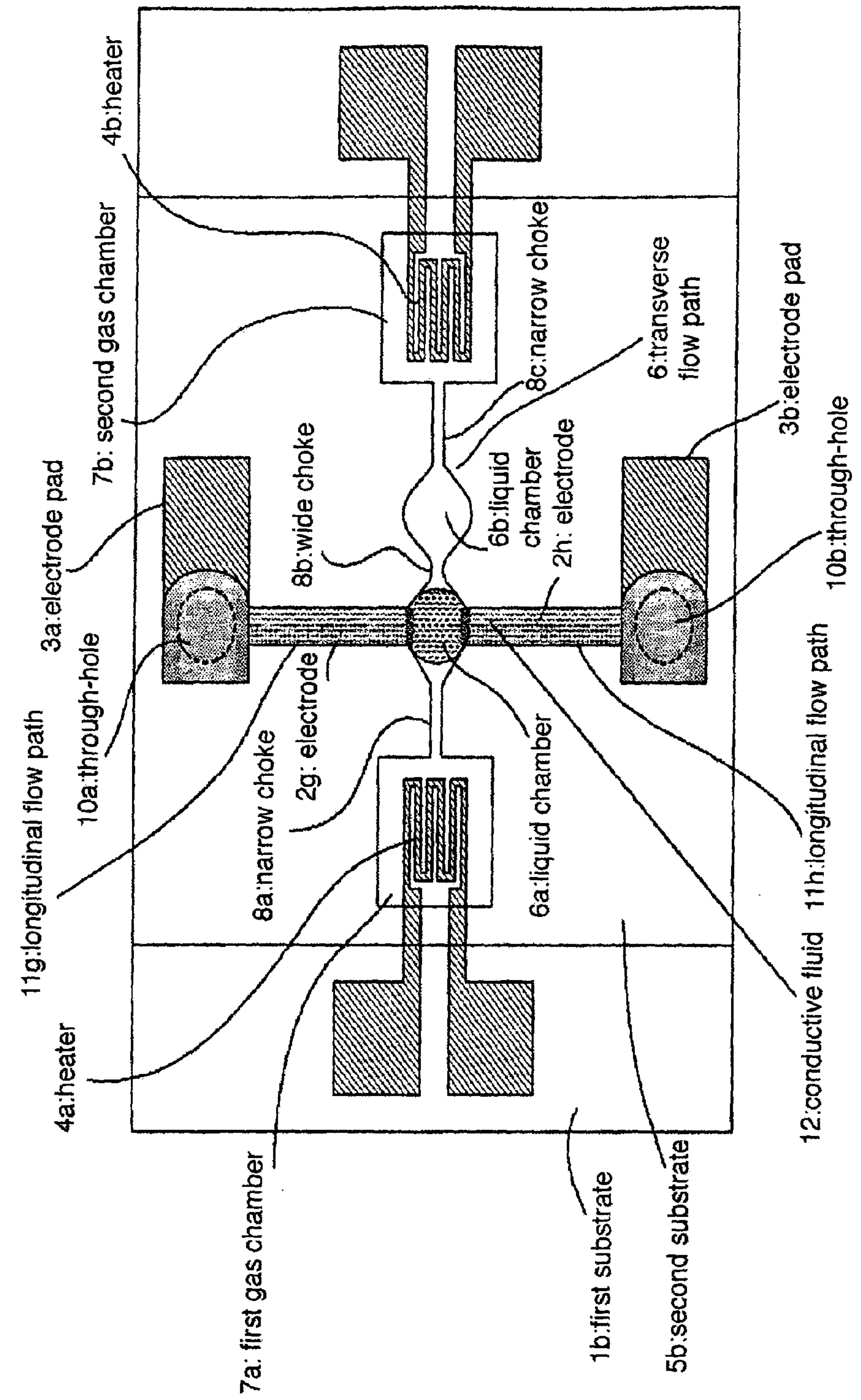
FIG. 5 is a block diagrams illustrating principal parts of still another embodiment of a relay according to the invention.

FIG. 5 is a plan view showing a still another embodiment of a two-electrode type relay according to the invention. The present embodiment is similar to the embodiments described with reference to FIGS. 1 and 3, respectively, in that the relay is fabricated by bonding a first substrate 1*b* with a second substrate 5*b*, omitting therefore a sectional view thereof.

On a face of the second substrate 5*b*, on one side thereof, there are formed the electrode pad 3*a* shown in FIG. 1, and an electrode pad 3*b* at a position opposite to the electrode pad 3*a*, and through-holes 10*a*, 10*b* are defined in the second substrate 5*b* so as to penetrate therethrough from the top faces of the respective electrode pads. Further, there are formed longitudinal flow paths 11*g*, 11*h*, leading from respective openings of the through-holes 10*a*, 10*b*, on a face of the second substrate 5*b*, on the other side thereof, and communicating with liquid chambers 6*a*, 6*b*, respectively.

Then, as with the case of the relay shown in FIG. 1, the second substrate 5*b* is bonded with the first substrate 1*b*, and subsequently, a conductive fluid (for example, mercury, a GaInSn alloy) 12 is introduced through the respective through-holes 10*a*, 10*b*. With the present embodiment, the conductive fluid 12 introduced through, for example, the through-hole 10*a* continues advancing even upon reaching the liquid chamber 6*a*, continuing advancement until the same reaches the through-hole 10*b* as shown in the figure.

In this case, narrow chokes 8*a*, 8*c*, interconnecting gas chambers 7*a*, 7*b*, and the liquid chambers 6*a*, 6*b*, respectively, are formed to have magnitude to the extent of not allowing shifting of the conductive fluid 12 by the agency of the surface tension thereof while a wide choke 8*b* interconnecting the liquid chambers 6*a*, 6*b* is formed to have magnitude to the extent of allowing shifting of the conductive fluid 12 when a predetermined pressure is applied thereto although shifting is prevented in a steady state condition.

Further, with the present embodiment as well, the interiors of the flow paths may be evacuated or purged by use of an inert gas such as nitrogen or argon prior to the introduction of the conductive fluid in order to prevent oxidation of the conductive fluid, as previously described.

As the electrode pads 3*a*, 3*b* are formed around the through-holes 10*a*, 10*b*, respectively, in the second substrate 5*b*, inlet ports of the respective through-holes are sealed with a conductive adhesive such as solder 13 or silver paste (not shown), as previously described.

Figure 6:
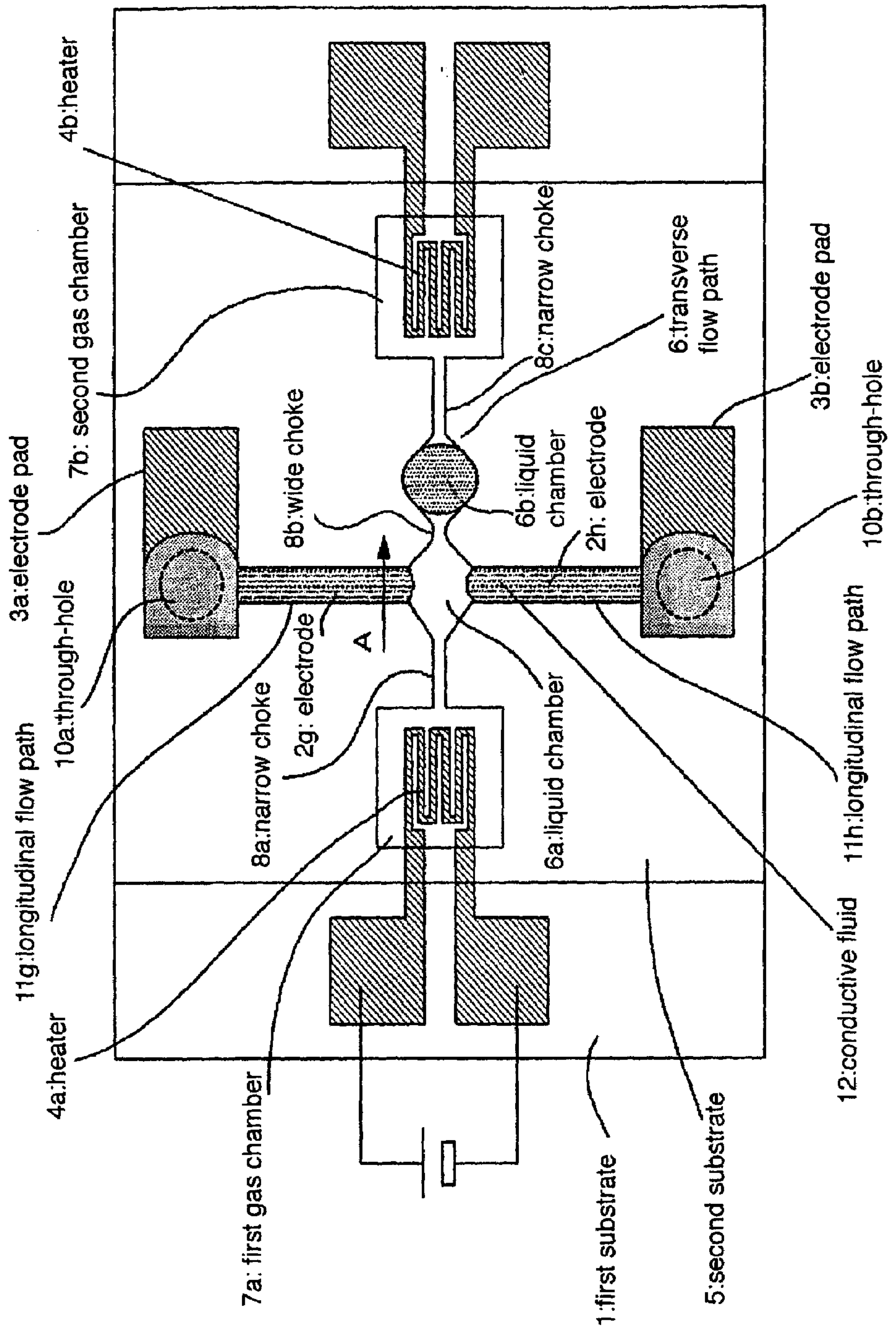
FIG. 6 is a schematic operation block diagram illustrating the operation of the relay in FIG. 5.

FIG. 6 shows a state where a heater 4*a* inside the gas chamber 7*a* is energized by a power source 14, and a gas (air, nitrogen gas, and so forth) is expanded by the agency of heat generated by the heater 4*a*.

As a result, the conductive fluid (for example, mercury) 12, is shifted from the side of the liquid chamber 6*a* toward the side of the liquid chamber 6*b*, as indicated by an arrow A, and consequently, electrodes 2*g*, 2*h* are in the OFF state.

Subsequently, if the power source 14, for the heater 4*a*, is turned OFF, and the heater 4*b* is energized by use of a power source (not shown), such a state as shown in FIG. 5 is restored.

FIGS. 7(A) to 7(E) are sectional views of principal parts of the relay described in the foregoing, showing the steps of fabricating through-holes 10, and longitudinal and transverse flow paths.

Figures 7A, 7B, 7C, 7D, 7E:
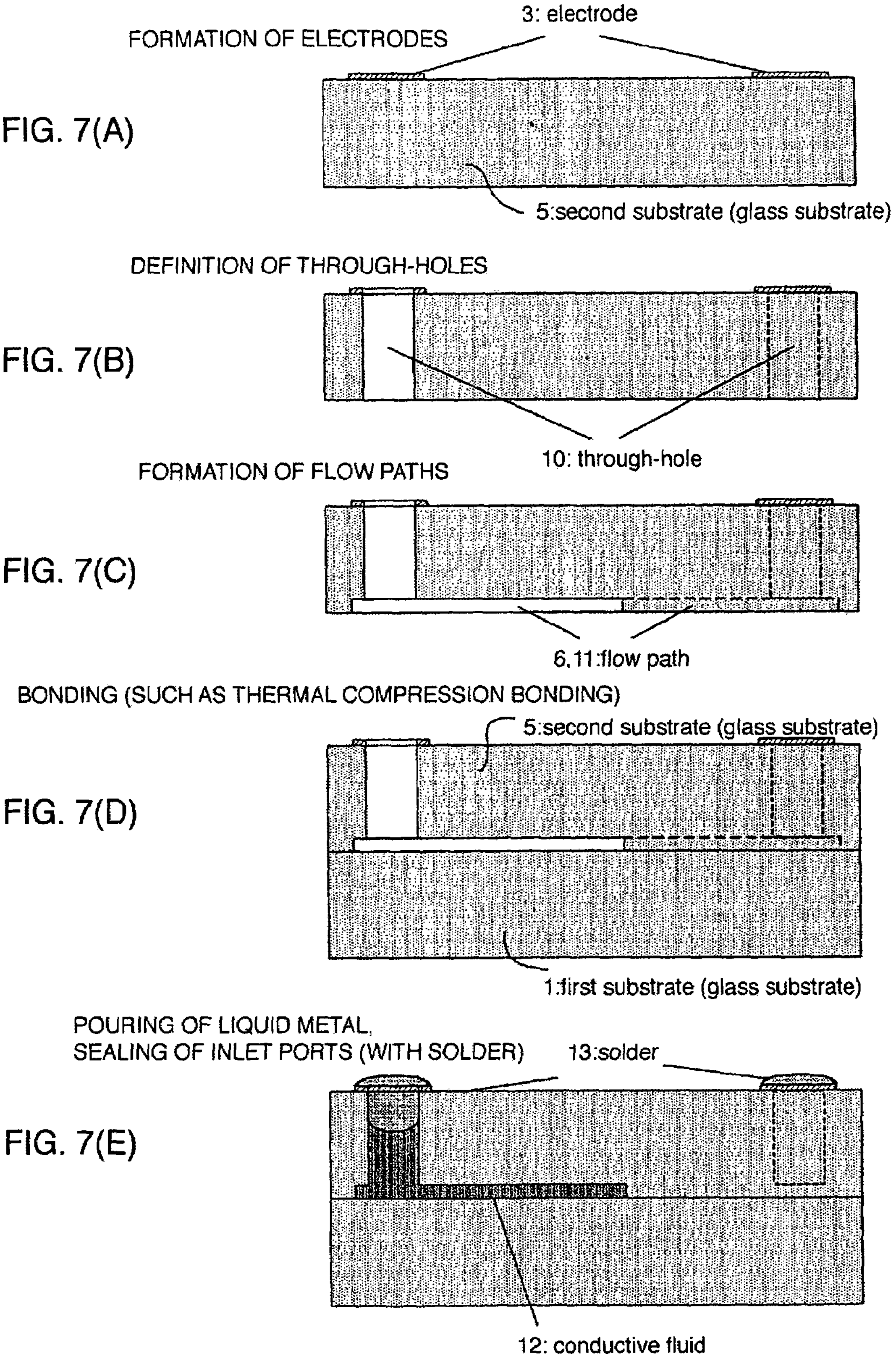
FIGS. 7(A) to 7(E) are sectional views showing the steps of fabricating principal parts of the relay according to the invention.

In a step shown in FIG. 7(A), electrodes 3 are formed at predetermined positions, respectively, on the top surface of a second substrate (glass substrate) 5.

In a step shown in FIG. 7(B), through-holes 10 are defined so as to penetrate through the second substrate 5 from the top surface thereof. In this case, respective sizes of the through-holes 10 are designed such that there remains a sufficient portion of each of the electrodes 3, surrounding each of the through-holes 10.

In a step shown in FIG. 7(C), longitudinal and transverse flow paths are formed on a face of the second substrate 5, on a side opposite from the top surface thereof, with the electrodes 3 formed thereon.

In a step shown in FIG. 7(D), the face of the second substrate 5, with the flow paths formed thereon is bonded with a face of a first substrate 1, on one side thereof.

In a step shown in FIG. 7(E), a conductive fluid 12 is poured into the flow paths through respective inlet ports of the through-holes 10, and subsequently, the respective inlet ports of the through-holes 10 are sealed with solder 13.

Because the relay described in the foregoing is fabricated by use of the technology of the microelectromechanical•systems, it is possible to implement miniaturization of the relay, so that a volume of the flow paths is reduced and mercury sealed therein can be controlled to the order of $1\times10^{-5}$ g (10,000 pieces of relays can be fabricated with an amount (about 0.1 g) of mercury, corresponding to that for a fluorescent lamp), thereby enabling an environmental impact of mercury to be lessened.

Further, it is to be pointed out that the description given hereinbefore is intended to explain the present invention, and to give examples, simply showing specific preferred embodiments. With the embodiments described in the foregoing, for example, mercury is used for the conductive fluid, however, use may be made of other conductive fluids (for example, GaIn, and GaInSn) similar in function to mercury, and for the gas, use may be made of a gas other than air, and nitrogen gas (for example, hydrogen, argon, ammonia, and so forth). Still further, the shapes of the follow paths, shapes of the electrodes, and shapes of the heaters, and the gas chambers are not limited to those shown in the figures. In FIG. 1, three electrodes are shown, however, two electrodes may be used as shown in FIG. 5.

Yet further, for the substrates, glass is used, however, use may be made of other members having insulating property, and suitable for a photolithographic process and etching (for example, a silicon substrate with an oxide film and a nitride film, formed thereon), and the shape of the substrate is not limited to a rectangle.

Furthermore, with the present embodiments, the gas is expanded by use of the heater, however, the conductive fluid may be shifted by causing the gas to undergo contraction by use of cooling means (for example, a Peltier element, and so forth). It is therefore to be understood that the invention is not limited to the above-described embodiments, and that various changes and modifications may be made in the invention without departing from the spirit and scope thereof.

What is claimed is:

1. A relay comprising:

a flow path having narrow chokes and wide chokes, formed by bonding two insulating members together;

a plurality of liquid chambers formed by partitioning the flow path with the narrow chokes and the wide chokes;

a plurality of electrodes disposed at the plurality of the liquid chambers, respectively;

first and second gas chambers disposed so as to communicate with respective ends of the flow path;

a gas sealed in the first and second gas chambers, respectively;

heating means for heating the gas; and holes defined in one of the insulating members, communicating with the flow path, respectively;

wherein a conductive fluid is introduced into the flow path through respective inlet ports of the holes, and the respective inlet ports are sealed.

2. A relay according to claim 1, wherein the plurality of the electrodes each are disposed so as to have one end being in contact with the conductive fluid sealed in the flow path, and to have the other end coming into contact, or non-contact with the conductive fluid shifting inside the flow path due to expansion/contraction of the gas on the basis of ON/OFF of the heating means.

3. A relay comprising:

a flow path having narrow chokes and wide chokes, formed by bonding two insulating members together;

a plurality of liquid chambers formed by partitioning the flow path with the narrow chokes and the wide chokes;

first and second gas chambers disposed so as to communicate with respective ends of the flow path;

a gas sealed in the first and second gas chambers, respectively;

heating means for heating the gas; and at least two holes defined in one of the insulating members, communicating with the flow path, respectively;

wherein a conductive fluid is introduced into the flow path through an inlet port of at least one of the at least two holes, and the inlet port is sealed with a conductive member so that the conductive fluid comes into contact with the conductive member.

4. A relay according to any of claims 1 to 3, wherein the two insulating members are formed such that one thereof is larger or smaller in area than the other.

5. A relay according to any of claims 1 to 3, wherein the flow path, the electrodes, the liquid chambers, and the gas chambers are formed by use of a technology of microelectromechanical•systems.

6. A relay according to any of claims 1 to 3, wherein the conductive fluid includes any selected from the group consisting of mercury, GaIn, and GaInSn, and the gas includes any selected from the group consisting of air, nitrogen, argon, hydrogen, and ammonia.

7. A relay according to claim 4, wherein the flow path, the electrodes, the liquid chambers, and the gas chambers are formed by use of a technology of microelectromechanical•systems.

8. A relay according to claim 4, wherein the conductive fluid includes any selected from the group consisting of mercury, GaIn, and GaInSn, and the gas includes any selected from the group consisting of air, nitrogen, argon, hydrogen, and ammonia.

9. A relay according to claim 5, wherein the conductive fluid includes any selected from the group consisting of mercury, GaIn, and GaInSn, and the gas includes any selected from the group consisting of air, nitrogen, argon, hydrogen, and ammonia.

* * * * *